(12) United States Patent
Ishikawa et al.

(10) Patent No.: US 9,667,548 B2
(45) Date of Patent: May 30, 2017

(54) RELAY APPARATUS AND RELAY METHOD

(71) Applicant: ALAXALA Networks Corporation, Kanagawa (JP)

(72) Inventors: Yuichi Ishikawa, Kawasaki (JP); Kentarou Sugawara, Kawasaki (JP); Takeshi Kumagai, Kawasaki (JP); Naoya Kumita, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 193 days.

(21) Appl. No.: 14/535,782

(22) Filed: Nov. 7, 2014

(65) Prior Publication Data
US 2015/0138978 A1    May 21, 2015

(30) Foreign Application Priority Data

Nov. 15, 2013    (JP) ................................ 2013-236718

(51) Int. Cl.
| | |
|---|---|
| *H04L 1/00* | (2006.01) |
| *H04L 12/801* | (2013.01) |
| *H04L 12/741* | (2013.01) |

(52) U.S. Cl.
CPC .............. *H04L 47/12* (2013.01); *H04L 45/74* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,046,625 | B1 * | 5/2006 | Kasper | H04L 49/25 370/230 |
| 2003/0128708 | A1 * | 7/2003 | Inoue | H04L 29/06 370/395.42 |
| 2006/0171385 | A1 * | 8/2006 | Itou | H04L 1/0057 370/389 |
| 2007/0058532 | A1 | 3/2007 | Wadekar et al. | |

(Continued)

FOREIGN PATENT DOCUMENTS

| | | |
|---|---|---|
| JP | 2005-123985 A | 5/2005 |
| JP | 2009-71360 A | 4/2009 |

(Continued)

OTHER PUBLICATIONS

Japanese Office Action received in corresponding Japanese Application No. 2013-236718 dated Dec. 8, 2015.

*Primary Examiner* — Bob Phunkulh
(74) *Attorney, Agent, or Firm* — Mattingly & Malur, PC

(57) ABSTRACT

It is provided a relay apparatus, comprising: a plurality of ports coupled to a network; a Layer 2 processing module for relaying, via the network, a frame comprising a Layer 2 header and a Layer 2 data segment, the Layer 2 data segment comprising a Layer 3 header and a Layer 3 data segment; and an output unit, wherein the module updates a value of a particular field of the Layer 3 header, uses a first characteristic value related to the Layer 3 header, which is stored in a given field, and a pre-update value and post-update value of the particular field to compute a second characteristic value related to the Layer 3 header, and updates the value of the given field from the first characteristic value to the second characteristic value, and wherein the output unit outputs the updated frame as an output destination of the updated frame.

9 Claims, 6 Drawing Sheets

(56) References Cited

U.S. PATENT DOCUMENTS

| | | | |
|---|---|---|---|
| 2007/0064737 A1* | 3/2007 | Williams | H04L 49/90 370/473 |
| 2008/0250496 A1 | 10/2008 | Namihira | |
| 2010/0246400 A1 | 9/2010 | Onishi et al. | |
| 2010/0309908 A1* | 12/2010 | Dolkas | H04L 12/2697 370/389 |
| 2011/0002224 A1 | 1/2011 | Tamura | |
| 2012/0063316 A1* | 3/2012 | Ghanwani | H04L 47/10 370/235 |
| 2014/0016461 A1 | 1/2014 | Ishikawa et al. | |

FOREIGN PATENT DOCUMENTS

| | | |
|---|---|---|
| JP | 2010-148031 A | 7/2010 |
| JP | 2010-232876 A | 10/2010 |
| JP | 2011/15288 A | 1/2011 |
| JP | 2013-38570 A | 2/2013 |
| WO | 2005/036831 A1 | 4/2005 |

\* cited by examiner

RELAY APPARATUS AND RELAY METHOD

CLAIM OF PRIORITY

The present application claims priority from Japanese patent application JP 2013-236718 filed on Nov. 15, 2013, the content of which is hereby incorporated by reference into this application.

BACKGROUND OF THE INVENTION

This invention relates to a relay apparatus for relaying data and a relay method.

Explicit Congestion Notification (ECN), which is one of congestion notification technologies, is in the spotlight as an optional function installed in Linux (trademark), Windows (trademark), and other operating systems (OSes), and as a topic of active discussion at the Internet Engineering Task Force (IETF).

ECN is a congestion notification technology in which, when congestion occurs in a packet relaying apparatus that constitutes a part of a network, such as a router/switch, the router/switch itself explicitly marks a data packet transmitted from a transmitting terminal with congestion information, and transmits the marked data packet to a receiving terminal, thereby notifying the congestion information to the receiving terminal (see JP 2010-232876 A).

The congestion notification technology described above, however, is a technology of updating the Layer 3 (hereinafter abbreviated as L3) header field of a frame in L3 relay, and does not update the L3 header field in Layer 2 (hereinafter abbreviated as L2) relay. Congestion in a relay apparatus of an L2 network therefore cannot be notified with the above-mentioned technology. In addition, related-art relay apparatus do not execute an error check for the L3 header of a frame in L2 relay. Consequently, executing a rewrite of the L3 header in L2 relay in order to notify congestion corrects the L3 header erroneously. Data reliability may thus be impaired when a relay apparatus relays data packets of different layers.

SUMMARY OF THE INVENTION

It is an object of this invention to improve the reliability of data relay.

An aspect of the invention disclosed in this application is a relay apparatus for relaying data and a relay method, including: a plurality of ports coupled to a network; a Layer 2 processing module for relaying, via the network, a frame that comprises a Layer 2 header and a Layer 2 data segment, the Layer 2 data segment comprising a Layer 3 header and a Layer 3 data segment; and an output unit, wherein the Layer 2 processing module comprises a Layer 2 updating module for updating a value of a particular field out of a plurality of fields of the Layer 3 header, for using a first characteristic value related to the Layer 3 header, which is stored in a given field out of the plurality of fields, and a pre-update value and post-update value of the particular field to compute a second characteristic value related to the Layer 3 header, and for updating the value of the given field from the first characteristic value to the second characteristic value, and wherein the output unit outputs, to the network, the frame updated by the Layer 2 updating module from a port that is specified from among the plurality of ports as an output destination of the updated frame.

According to the exemplary embodiment of this invention, the reliability of data relay is improved. Other objects, configurations, and effects than those described above are clarified by the following description of an embodiment.

DETAILED DESCRIPTION OF THE PREFERRED EMBODIMENT

Network Configuration Example

Figure 1:
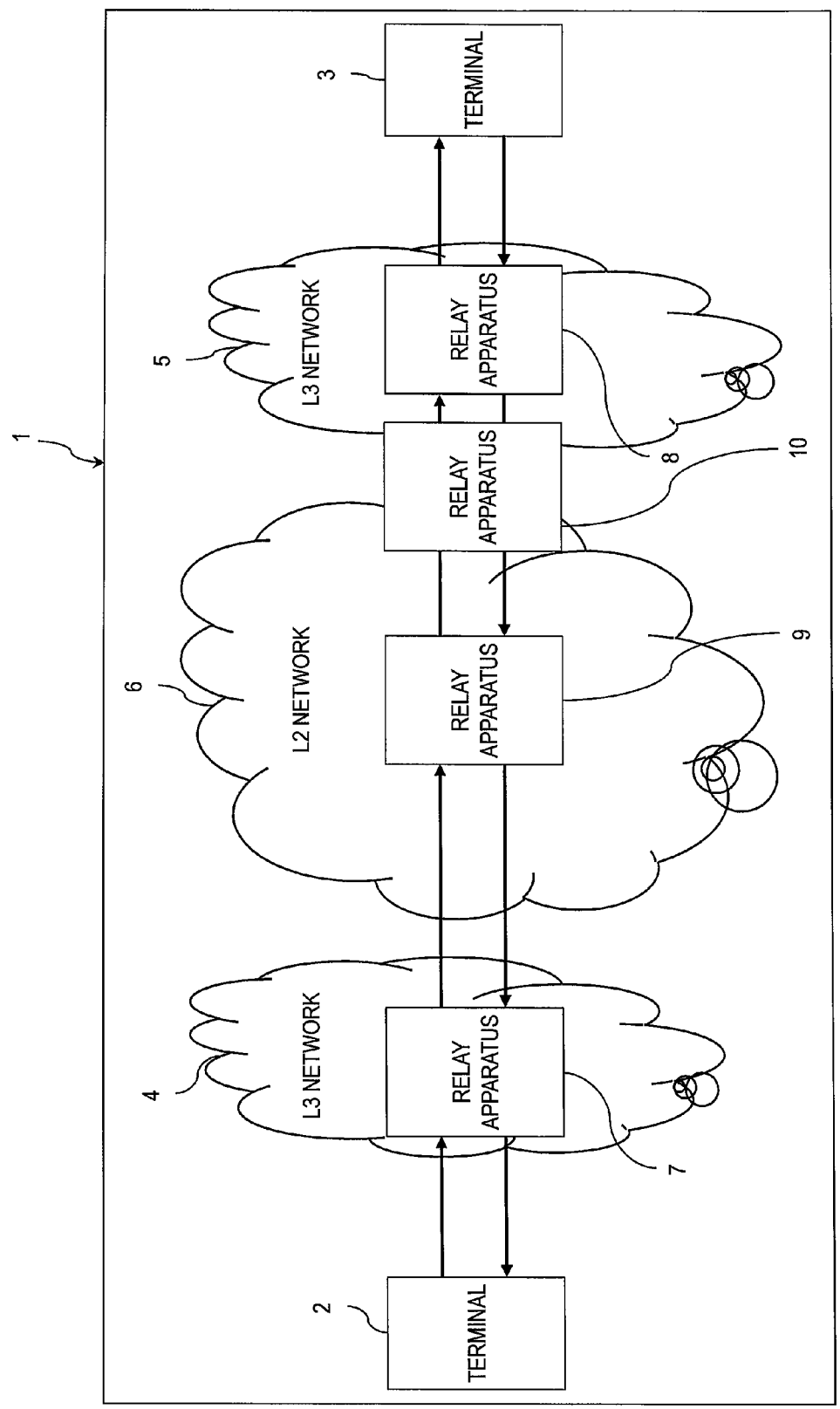
FIG. 1 is an explanatory diagram illustrating a configuration example of a network 1 according to an embodiment of this invention.

FIG. 1 is an explanatory diagram illustrating a configuration example of a network 1 according to an embodiment of this invention. The network 1 includes L3 networks 4 and 5 and an L2 network 6 between terminals 2 and 3, and the terminal 2 as a sender transmits packets to the terminal 3 as a destination via relay apparatus 7, 8, 9, and 10 in the L3 networks 4 and 5 and the L2 network 6. The L2 network 6 is, for example, a network over which packets are transported through L2 relay by the relay apparatus 9 and 10. The L3 networks 4 and 5 are, for example, networks over which packets are transported through L3 relay by the relay apparatus 7, 8, and 10.

Each of the relay apparatus 7, 8, 9, and 10 includes an L2 processing module (a processor) configured to execute relay processing in the L2 network 6, and an L3 processing module (a processor) configured to execute relay processing in the L3 networks 4 and 5. The relay apparatus 7 and 8, which are disposed in the L3 networks 4 and 5, respectively, use the L3 processing module to execute data relay, and the relay apparatus 9, which is disposed in the L2 network 6, uses the L2 processing module to execute data relay. The relay apparatus 10, which is disposed at the border between the L2 network 6 and the L3 network 5, uses the L2 processing module to relay data in the case where the data is from the L3 network 5 and is to be transported to the L2 network 6, or in the case where the data is from within the L2 network 6 and is to be transported inside the L2 network 6. The relay apparatus 10 uses the L3 processing module to relay data in the case where the data is from the L2 network 6 and is to be transported to the L3 network 5, or in the case where the data is from within the L3 network 5 and is to be transported inside the L3 network 5.

The L2 processing module transports a received frame following a protocol in Layer 2 (the data link layer) of the OSI Reference Model (for example, the Ethernet protocol). The L3 processing module transports a received frame following a protocol in Layer 3 (the network layer) of the OSI Reference Model (the IP protocol).

First, the terminal 2 transmits a packet to the terminal 3. The transmitted packet is a packet capable of ECN. A concrete example of a packet capable of ECN is one in which the value of an ECN field within a type-of-service (TOS) field of the L3 header is rewritten with one of values that mean that the packet is capable of congestion detection, "ECT (0)" and "ECT (1)" (ECT stands for ECN-Capable Transport). The packet reaches the relay apparatus 9 of the L2 network 6 via the relay apparatus 7 of the L3 network 4.

In the case where congestion occurs in the relay apparatus 9 of the L2 network 6, the relay apparatus 9 executes ECN marking in which the value of the ECN field of the packet from the terminal 2 is rewritten with a value "CE", which means that congestion has been detected (that the packet has been ECN-marked) (CE stands for Congestion Experienced).

The relay apparatus 9 transmits the ECN-marked packet to the terminal 3 via the relay apparatus 8 of the L3 network 5. In this manner, packets from the L3 network 4 can be relayed despite congestion in the L2 network 6 while minimizing the quantity of packets that are discarded.

When there is no congestion, the terminal 3 following the Transmission Control Protocol (TCP) normally transmits an acknowledge (ACK) packet to the terminal 2 in response to a packet from the terminal 2. In this example, where the relay apparatus 9 of the L2 network 6 is undergoing congestion, the terminal 3 returns an ECN-echo ACK packet to the terminal 2 when receiving an ECN-marked packet from the relay apparatus 9. An ECN-echo ACK packet is a packet in which "1" is set to an ECN echo (ECE) flag, which is an extended TCP control flag extended for ECN in order to notify the terminal 2 that congestion has been detected. The ECN-echo ACK packet is transmitted to the terminal 2 via the L3 network 5, the L2 network 6, and the L3 network 4.

The terminal 2 receives the ECN-echo ACK packet and, determining that the network is congested, avoids congestion by putting restrictions on a transmission band based on a congestion avoiding function of the TCP. After executing the congestion avoiding processing, the terminal 2 sets a Congestion Window Reduced (CWR) flag, which is a TCP control flag, to a packet, and transmits the packet to which the CWR flag is set to the terminal 3. The CWR flag is an extended TCP control flag which is extended for ECN in order to stop the ECE flag from being set to an ACK packet returned by the terminal 3 after the terminal 2 executes the congestion avoiding processing.

The terminal 3 receives the packet to which the CWR flag is set, and stops setting the ECE flag. ECN-echo ACK packets are thus no longer transmitted. The same processing is executed also when the L3 network 4 or the L3 network 5 is not included in this example. In the case where congestion occurs in one of the L3 networks, the relay apparatus 7 or 8 executes ECN marking as when the network is normal.

Using ECN thus enables the relay apparatus 9 of the L2 network 6 to detect its congestion as well, and to explicitly notify a terminal of the congestion while relaying packets with the quantity of packets that are discarded when congestion is detected minimized. This makes it possible to prompt restrictions on a transmission band, and accordingly reduce the discarding of packets and a drop in communication quality due to the accompanying retransmission of the packets.

A concrete description is given on ECN marking by the L2 processing module in the relay apparatus 9. In ECN marking, the relay apparatus 9 rewrites the value of the ECN field of the packet from the terminal 2 with the value "CE", which means that congestion has been detected. After rewriting the value of the ECN field, the relay apparatus 9 obtains a checksum and writes the obtained checksum in a checksum field 235. Checksum computing methods that may be used in this case are total checksum computation and differential checksum computation.

Total checksum computation is a computing method in which the sum of values in the L3 header is obtained after the value of the ECN field is rewritten. However, the value of the checksum field 235 is "0" in this case. The obtained checksum is written in the checksum field 235, and the relay apparatus 9 transmits the packet in which the value of the ECN field and the value of the checksum field 235 have been rewritten to the terminal 3 via the L3 network 5.

In total checksum computation, where a checksum is computed without using a checksum that has originally been written in the checksum field 235 and the new checksum is written in the checksum field 235, the original checksum is lost regardless of whether the original checksum is a correct value or a wrong value. Accordingly, in the case where a bit error that has occurred between the terminal 2 and the relay apparatus 9 causes a change in destination IP address, for example, an erroneous correction is made and the packet is treated as a normal packet despite the error in the L3 header. The thus erroneously corrected packet is transported to a wrong destination via the relay apparatus 7 and fails to arrive at the terminal 3.

The relay apparatus 9 in this embodiment therefore executes differential checksum computation, instead of total checksum computation, in ECN marking by the L2 processing module. Differential checksum computation is a computing method that uses the value of a rewritten field in the L3 header (IP header) to compute a checksum. In this example, values of the ECN field before and after the rewrite and the original checksum are used. Accordingly, an error included in the original checksum is preserved in a checksum obtained by differential checksum computation, and the rewrite of the value of the ECN field is executed as well, thus ensuring that a normal packet is delivered to the terminal 3 normally along with a congestion notification, whereas a packet that contains an error is detected by error detection and discarded in the L3 network 5.

<Frame Format Example>

Figure 2:
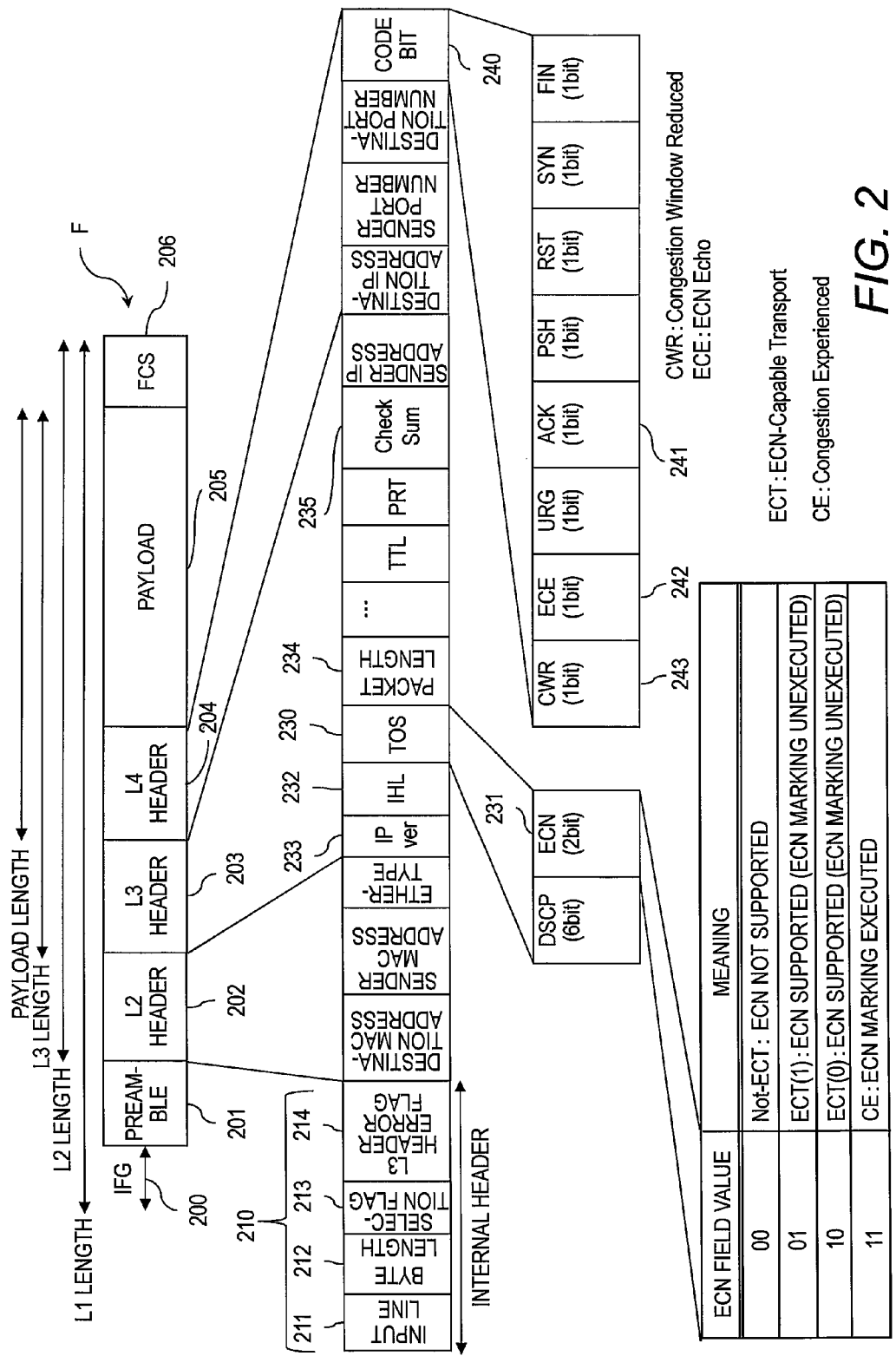
FIG. 2 is an explanatory diagram illustrating an example of the format of a frame.

FIG. 2 is an explanatory diagram illustrating an example of the format of a frame. A frame F includes a preamble 201, an L2 header 202, an L3 header 203, an L4 header 204, a payload 205, and a frame check sequence (FCS) 206. An inter-frame gap (IFG) 200 is a gap between the transmission of one frame F and the transmission of the next frame F.

An ECN field 231, which takes up the last two least significant bits in a TOS field 230 within the L3 header 203, is described as an example of fields that are rewritten in this embodiment. The ECN field 231 takes values illustrated in FIG. 2. The initial value of the ECN field 231 is set by the terminal 2, which is the sender of the frame F. The sender terminal 2 sets the ECN field 231 to a value "01" or "10" in the case where the terminal 2 supports ECN, and to a value "00" in the case where the terminal 2 does not support ECN.

The terminal 3 receives a packet from the terminal 2 and returns an ACK packet in which "1" is set as the value of an ACK field 241 of a code bit 240 in the L4 header 204. In the case where the terminal 3 sends an ECN-echo ACK packet in response to a received packet, the value of an ECE field 242 is also set to "1" in the ECN-echo ACK packet. The sender terminal 2 receives the ECN-echo ACK packet and returns a CWR packet in which the value of a CWR field 243 is set to "1" to the terminal 3.

An input line number 211, a byte length 212, a selection flag 213, and an L3 header error flag 214 constitute an internal header 210, which is attached when the frame F is taken into the relay apparatus 9 of the L2 network 6. The input line number 211 indicates a number assigned to a line (port) through which the frame F is input to the relay apparatus 9. The byte length 212 indicates, for example, the L1 length of the frame F. The length indicated by the byte length 212 is not limited to the L1 length, and may be the L2 length or L3 length of the frame F.

The selection flag 213 is a flag for identifying which of a reception-side L2 processing module 322 and a reception-side L3 processing module 323 has been chosen by a reception-side L2/L3 selecting module (a switch, a selector) 321, which is described later, and is referred to by a transmission-side L2/L3 selecting module 324. The L3 header error flag 214 is a flag that is enabled when an error is detected by an L3 header error checking module 341, which is described later. An internal header length (IHL) field 232 in the L3 header 203 stores an IHL value which expresses the L3 header length in units of four bytes. Information stored in the internal header 210 is not limited to those described above and, though not shown, the internal header 210 stores pieces of information obtained from respective processing procedures.

Figure 3:
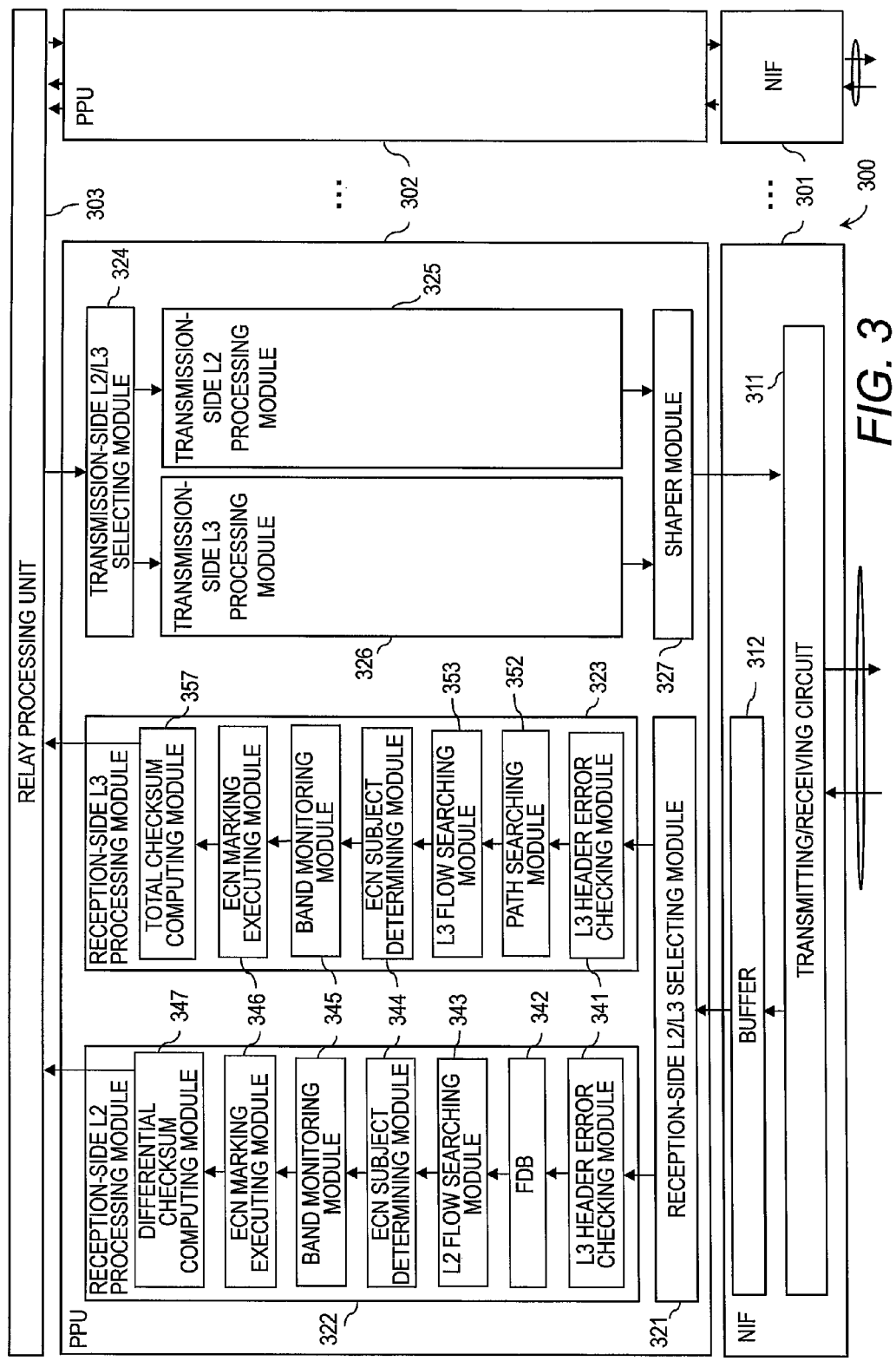
FIG. 3 is an explanatory diagram illustrating a configuration example of the relay apparatus.

FIG. 3 is an explanatory diagram illustrating a configuration example of the relay apparatus 7, 8, 9, and 10. A relay apparatus 300 (the relay apparatus 7, 8, 9, and 10) includes a plurality of pairs of a network interface (NIF) 301 and a packet processing unit (PPU) 302, and a relay processing unit (switch fabric) 303. Each NIF 301 is connected to its paired PPU 302, and each PPU 302 is connected to the relay processing unit 303.

Each NIF 301 is an output unit which includes a transmitting/receiving circuit 311 and a buffer 312. The transmitting/receiving circuit 311 receives the frame F transmitted from the outside, attaches the internal header 210 illustrated in FIG. 2 to the received frame F, and then outputs the frame F to the buffer 312. To give a concrete example, the transmitting/receiving circuit 311 attaches the internal header 210 by identifying the input line number 211 of a line through which the frame F is received and the byte length 212. At this stage, a value indicating "unselected" and a value indicating "undetected" are set as the selection flag 213 and the L3 header error flag 214, respectively.

The buffer 312 outputs, to the relevant PPU 302, each frame F to which the internal header 210 has been attached in an order in which the frames F have been input from the transmitting/receiving circuit 311. The transmitting/receiving circuit 311 also outputs the frame F from the relevant PPU 302 to the outside. When transmitting the frame F to the outside, the transmitting/receiving circuit 311 rewrites the ECN field 231 of the frame F. Specifically, in the case where the value of the ECN field 231 is "01" or "10" and ECN marking is executed, the transmitting/receiving circuit 311 rewrites the value of the ECN field 231 with "11". The ECN field 231 is not rewritten in the case where the value of the ECN field 231 is "00" or "11".

Each PPU 302 has reception-side components and transmission-side components. The reception-side components are described first. The reception-side components of the PPU 302 include the reception-side L2/L3 selecting module 321, the reception-side L2 processing module 322, and the reception-side L3 processing module 323. The reception-side L2/L3 selecting module 321 selects one of the reception-side L2 processing module 322 and the reception-side L3 processing module 323 as a module that processes the frame F transmitted from the buffer 312, based on the destination MAC address of the frame F.

For example, in the case where the destination MAC address of the frame F from the buffer 312 is the MAC address of its own relay apparatus, the reception-side L2/L3 selecting module 321 selects the reception-side L3 processing module 323 and transports the frame F to the reception-side L3 processing module 323. In the case where the destination MAC address of the frame F from the buffer 312 is not the MAC address of its own relay apparatus, on the other hand, the reception-side L2/L3 selecting module 321 selects the reception-side L2 processing module 322, and transports the frame F to the reception-side L2 processing module 322. When transporting the frame F, the reception-side L2/L3 selecting module 321 sets the selection flag 213 in the internal header 210 of the frame F to a value for identifying a processing module to which the frame F is being transported. The set selection flag 213 is referred to by the transmission-side L2/L3 selecting module 324.

The reception-side L2 processing module 322 includes an L3 header error checking module 341, an FDB 342, an L2 flow searching module 343, an ECN subject determining module 344, a band monitoring module 345, an ECN marking executing module 346, and a differential checksum computing module 347.

The L3 header error checking module 341 checks whether or not there is an error in the L3 header 203 of the frame F from the reception-side L2/L3 selecting module 321. To give a concrete example, the L3 header error checking module 341 checks whether the value of an IP version field 233 in the L3 header 203 is a normal value. In the case of IPv4, for example, the L3 header error checking module 341 checks whether the value of the IP version field 233 is "4".

The L3 header error checking module 341 also checks whether the relation between the L2 length of the frame F and a total length (TL) value stored in a packet length field 234 of the L3 header 203 is normal. The relation is normal when, for example, TL is equal to or longer than the L2 length.

The L3 header error checking module 341 also checks whether the relation between the value of the IHL field 232 (IHL) in the L3 header 203 and TL is normal. The relation is normal when, for example, IHL×4 is equal to or shorter than TL. The L3 header error checking module 341 also checks whether the value of the IHL field 232 (IHL) in the L3 header 203 is a normal value. The value of the IHL field 232 is normal when, for example, $5 \leq \text{IHL}$ is satisfied.

The L3 header error checking module 341 also checks whether there is a checksum error. For example, the L3 header error checking module 341 calculates a checksum that is obtained by setting "0" as the value of the checksum field 235 in the L3 header 203 (what is called total checksum), and determines whether or not the calculated checksum matches a checksum that has been stored in the checksum field 235 of the frame F. The checksum is normal when the two match.

Not all of these' checks may be executed and the relay apparatus 300 may be designed so that it is sufficient if at least one of the checks is executed. When detecting an abnormality in the frame F, the L3 header error checking module 341 treats the frame F as an error frame. Specifically, the L3 header error checking module 341 discards the frame F. The L3 header error checking module 341 may pass the frame F over to downstream processing instead of discarding the frame F. The L3 header error checking module 341 in this case sets the L3 error check flag in the internal header 210 to a value indicating that there is an error. The relay apparatus 300 may be designed so that the L3 header error checking module 341 treats the frame F as an error frame when an abnormality is detected in even one of a plurality of checks executed. The relay apparatus 300 may also be configured so that the reception-side L2 processing module 322 does not include the L3 header error checking module 341.

The FDB 342 has a filtering database which learns MAC addresses and output ports, and searches for the port number of an output port from which the frame F is to be output. The found port number of the output port is referred to by the relay processing unit 303. The frame F is transported to the PPU 302 that is paired with the NIF 301 that has the output port found as a result of the search. The L2 flow searching module 343 searches for a flow to which the frame F belongs. The found flow is used by the band monitoring module 345 in band measurement which is executed on a flow-by-flow basis.

The ECN subject determining module 344 determines whether or not the frame F for which the L2 flow searching module 343 has conducted a flow search is an ECN subject. To give a concrete example, the ECN subject determining module 344 refers to the value of the ECN field 231 and, when the value is "01" or "10", determines that the frame F is an ECN subject. The ECN subject determining module 344 processes an ECN-echo ACK packet as a non-ECN determination subject. Specifically, a packet in which "1" is set to the ACK field 241 of the code bit 240 is an ECN-echo ACK packet and is accordingly processed as a non-ECN determination subject. The same applies to an L2-side ECN subject determining module 404 and an L3-side ECN subject determining module 405 in a shaper module 327, which is described later.

The band monitoring module 345 monitors the band of the frame F. To give a concrete example, the band monitoring module 345 uses the leaky bucket algorithm to measure the band of a flow to which the frame F belongs. The band monitoring module 345 then determines whether or not the measured band exceeds a bandwidth allotted by a contract. In the case where the measured band exceeds the allotted bandwidth, the band monitoring module 345 determines that congestion has occurred. Band monitoring executed by the band monitoring module 345 varies depending on the result of the determination made by the ECN subject determining module 344. For instance, the band monitoring module 345 executes the band monitoring described above for the frame F that is not an ECN subject. For the frame F that is an ECN subject, on the other hand, the band monitoring module 345 executes stochastic violation determination.

Stochastic violation determination is processing of determining stochastically whether congestion has occurred. For example, a graph is prepared in which the axis of abscissas represents the bucket depth of a leaky bucket, the axis of ordinate represents a congestion marking probability, and the congestion marking probability increases in relation to the bucket depth. The congestion marking probability is a probability at which the ECN marking executing module 346 executes congestion marking.

A first threshold about the bucket depth and a second threshold larger than the first threshold are set in the graph. For example, when the bucket depth is equal to or more than 0 and is less than the first threshold, the congestion marking probability is 0%, and the congestion marking probability is a monotone increasing function that is greater than 0% and less than 100% when the bucket depth is equal to or more than the first threshold and is less than the second threshold. When the bucket depth is equal to or more then the second threshold, the congestion marking probability is 100%. In the stochastic violation determination, the band monitoring module 345 determines that a stochastic violation has occurred, namely, that congestion marking is to be executed, when a random number determined by a random dice is within the range of a congestion marking probability that is identified by the current bucket depth. A flag that indicates the result of this determination is set in the internal header 210.

Based on the result of the stochastic violation determination made by the band monitoring module 345, the ECN marking executing module 346 executes ECN marking. Specifically, when the flag that indicates a stochastic violation is set in the internal header 210, for example, the ECN marking executing module 346 sets a value "11" of the ECN field 231 which indicates that ECN has been executed in one of the internal header 210 and the ECN field 231. When the ECN field 231 is where the value "11" is to be set, the ECN marking executing module 346 copies the value of the ECN field 231 (in this case, one of "10" and "01" which indicate that ECN marking has not been executed) to the internal header 210 and the ECN field 231 is updated with the value "11" which indicates that ECN has been executed.

The differential checksum computing module 347 computes a differential checksum based on the internal header 210 and L3 header 203 of the frame F. An example of computing a differential checksum is given below. The differential checksum computing module 347 writes the computed differential checksum in the checksum field 235. In the case where the value "11" of the ECN field 231 which indicates that ECN has been executed is written in the internal header 210, the differential checksum computing module 347 overwrites the ECN field 231 with the value "11" of the ECN field 231 which indicates that ECN has been executed, after computing the differential checksum. The differential checksum computing module 347 then transports the frame F to the relay processing unit 303.

The reception-side L3 processing module 323 is described next. Components of the reception-side L3 processing module 323 that are the same as those of the reception-side L2 processing module 322 are denoted by the same reference symbols, and descriptions thereof are omitted. The reception-side L3 processing module 323 includes the L3 header error checking module 341, a path searching module 352, an L3 flow searching module 353, the ECN subject determining module 344, the band monitoring module 345, the ECN marking executing module 346, and a total checksum computing module 357.

The path searching module 352 refers to the L3 header 203 of the frame F to search a routing table for the port number of an output port from which the frame F is to be output. The found port number of the output port is referred to by the relay processing unit 303. The L3 flow searching module 353 searches for a flow to which the frame F belongs. The found flow is used by the band monitoring module 345 in band measurement which is executed on a flow-by-flow basis.

The total checksum computing module 357 computes a total checksum based on the L3 header 203 of the frame F. An example of computing a total checksum is given below. The total checksum computing module 357 writes the computed total checksum in the checksum field 235. The total checksum computing module 357 then transports the frame F to the relay processing unit 303.

The transmission-side components of the PPU 302 are described next. The PPU 302 includes, as the transmission-side components, the transmission-side L2/L3 selecting module 324, a transmission-side L2 processing module 325, a transmission-side L3 processing module 326, and the shaper module 327. Components that are the same as the reception-side components of the PPU 302 are denoted by the same reference symbols, and descriptions thereof are omitted.

The transmission-side L2/L3 selecting module 324 refers to the selection flag 213 in the internal header 210 of the frame F from the relay processing unit 303, and selects one of the transmission-side L2 processing module 325 and the transmission-side L3 processing module 326 as the transport destination of the frame F from the relay processing unit 303. The transmission-side L2/L3 selecting module 324 then transports the frame F to the selected processing module.

The transmission-side L2 processing module 325 includes the same components as the L2 flow searching module 343, the ECN subject determining module 344, the band monitoring module 345, the ECN marking executing module 346, and the differential checksum computing module 347 in the reception-side L2 processing module 322. The transmission-side L3 processing module 326 includes the same components as the L3 flow searching module 353, the ECN subject determining module 344, the band monitoring module 345, the ECN marking executing module 346, and the total checksum computing module 357 in the reception-side L3 processing module 323.

The shaper module 327 controls the bandwidth of a flow to which the frame F belongs, the bandwidth of an output line, and the like. The shaper module 327 outputs the frame F from the transmission-side L2 processing module 325 and the frame F from the transmission-side L3 processing module 326 to the transmitting/receiving circuit 311 of the relevant NIF 301. The shaper module 327 is capable of, in addition to the bandwidth control, executing ECN marking for the frame F that has not been ECN-marked in the reception-side L2 processing module 322, the reception-side L3 processing module 323, the transmission-side L2 processing module 325, and the transmission-side L3 processing module 326.

In the case where the frame F is determined as an ECN subject by the ECN subject determining module 344 of the reception-side or transmission-side L2 processing module or the reception-side or transmission-side L3 processing module, and the band monitoring module 345 determines that congestion has occurred, the L2 processing module or the L3 processing module executes ECN marking. In the case where the frame F is not determined as an ECN subject by the ECN subject determining module 344 of the reception-side or transmission-side L2 processing module or the reception-side or transmission-side L3 processing module, or in the case where the frame F is determined as an ECN subject by the ECN subject determining module 344 of the reception-side or transmission-side L2 processing module or the reception-side or transmission-side L3 processing module but the band monitoring module 345 does not determine that congestion has occurred, the L2 processing module or the L3 processing module does not execute ECN marking.

The shaper module 327 next uses the L2-side ECN subject determining module 404 or the L3-side ECN subject determining module 405 to determine an ECN-marked packet as a non-ECN subject. The shaper module 327 uses the ECN marking executing module 346 to execute ECN marking for a packet that has not been ECN-marked and is determined as an ECN subject, based on the result of stochastic violation determination made by a queue control module 401.

The relay processing unit 303 transports the frame F from one of the PPUs 302 to the PPU 302 that has an output destination port found by the sender PPU 302. The relay processing unit 303 is built from, for example, a crossbar switch.

In the relay apparatus 300, processing modules that follow an L2 protocol are a part of an L2 relay module, and processing modules that follow an L3 protocol are a part of an L3 relay module. For example, the reception-side L2 processing module 322 and the transmission-side L2 processing module 325 are a part of the L2 relay module, and the reception-side L3 processing module 323 and the transmission-side L3 processing module 326 are a part of the L3 relay module.

The function of checking an error in the L3 header 203 may be installed in the relay apparatus 9. This enables the relay apparatus 9 to discard a packet that has an error in the L3 header 203 prior to band monitoring. The relay apparatus 9 may instead take in an error packet of this type and, in this case also, executes ECN marking. The relay apparatus 9 may also be configured so that an error packet which has lost its header information reliability and whose affiliated flow cannot be determined normally as a result is excluded from subjects of band monitoring and is not marked by ECN marking. Consequently, a normal packet is delivered normally to the terminal 3 whereas a packet that contains an error is detected by error detection through a comparison of the differential checksum and discarded in the relay apparatus 8 of the L3 network 5, as in related-art error detection of an error packet. In the case where the relay apparatus 8 of the L3 network 5 is not included, an error packet is detected by error detection and discarded in the terminal 3.

The relay apparatus 9 may be an L2 switch. In this case, the reception-side L2/L3 selecting module 321, the reception-side L3 processing module 323, the transmission-side L2/L3 selecting module 324, and the transmission-side L3 processing module 326 are eliminated from the components of FIG. 3. A packet read out of the buffer 312 is transported to the reception-side L2 processing module 322, and a packet read out of the relay processing unit 303 is transported to the transmission-side L2 processing module 325.

Figure 4:
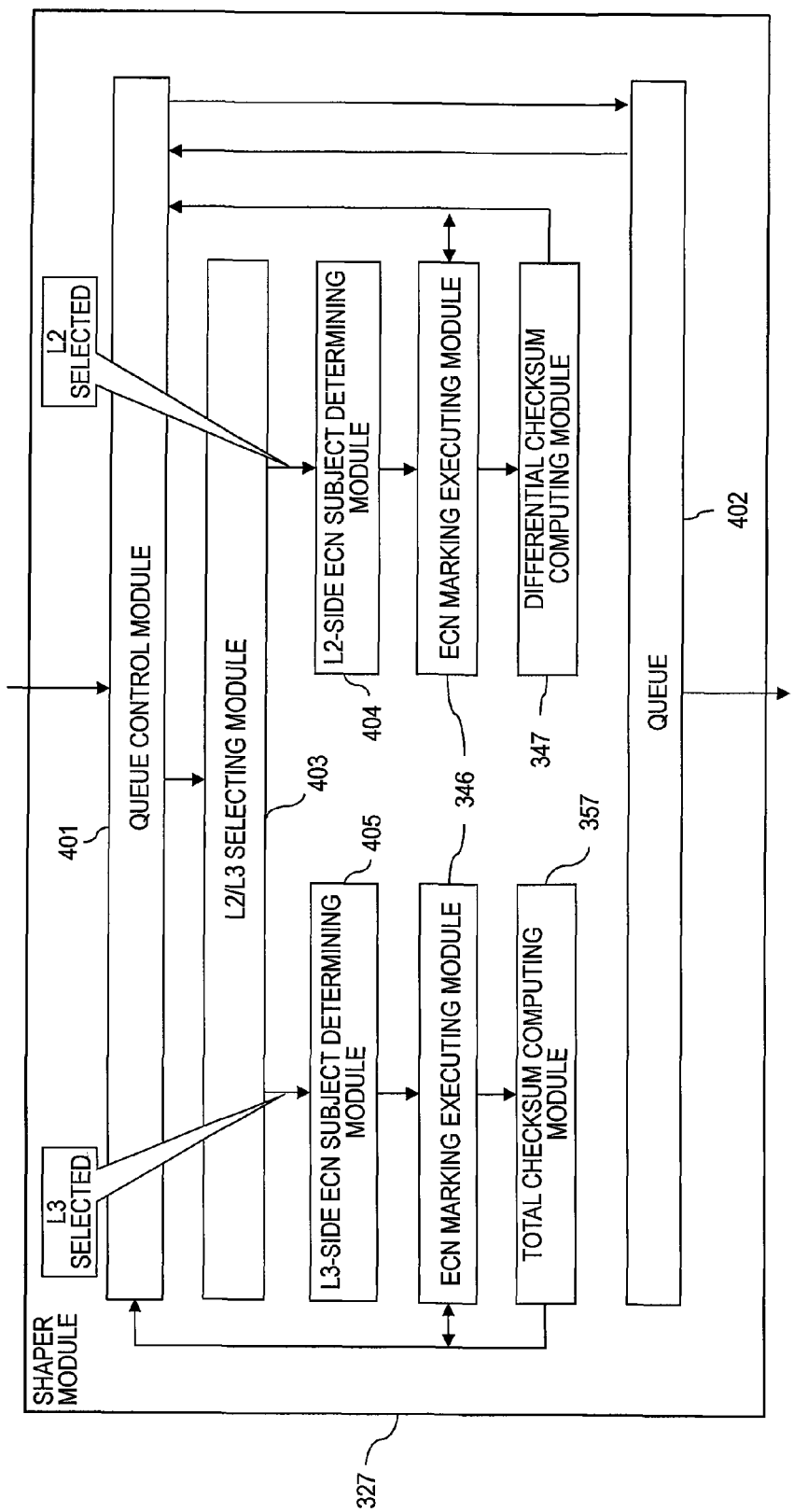
FIG. 4 is an explanatory diagram illustrating a configuration example of the shaper module.

FIG. 4 is an explanatory diagram illustrating a configuration example of the shaper module 327. The shaper module 327 includes the queue control module 401, an L2/L3 selecting module 403, the L2-side ECN subject determining module 404, the L3-side ECN subject determining module 405, the ECN marking executing module 346, the differential checksum computing module 347, and the total checksum computing module 357. Components of the shaper module 327 that are the same as those described above are denoted by the same reference symbols, and descriptions thereof are omitted.

The queue control module 401 refers to the queue length of a queue 402, and determines whether or not the queueing of the frame F is to be executed. To give a concrete example, the queue control module 401 executes the same processing as that of the band monitoring module 345 described above. The queue control module 401 uses, for example, the queue length instead of the bucket depth of the leaky bucket algorithm. The queue control module 401 also executes the stochastic violation determination described in the description of the band monitoring module 345. The queue 402 accumulates the frames F depending on the result of the queueing execution/cancellation determination made by the queue control module 401, and outputs the accumulated frames F in the order of input.

The L2/L3 selecting module 403 refers to the selection flag 213 in the internal header 210 of the frame F from the transmission-side L2 processing module 325 or the transmission-side L3 processing module 326, and selects one of the L2-side ECN subject determining module 404 and the L3-side ECN subject determining module 405 as the transport destination of the frame F. The L2/L3 selecting module 403 transports the frame F to the selected ECN subject determining module.

The L2-side ECN subject determining module 404 and the L3-side ECN subject determining module 405 each determine whether or not the frame F from the L2/L3 selecting module 403 is an ECN subject. To give a concrete example, the L2-side ECN subject determining module 404 and the L3-side ECN subject determining module 405 each refer to the value of the ECN field 231 and determine that the frame F is an ECN subject when the ECN field 231 has a value "01" or "10". The frame F that is not capable of ECN is written in the queue 402 via the queue control module 401.

The ECN marking executing module 346 executes ECN marking for the frame F that is determined as an ECN subject, based on the result of the stochastic violation determination made by the queue control module 401. The specifics of the processing are as described above.

An ECN-echo ACK packet that is received by the relay apparatus 7 set up in the L3 network 4 or the relay apparatus 8 set up in the L3 network 5 passes through the NIF 301, the reception-side L2/L3 selecting module 321, the reception-side L3 processing module 323, the relay processing unit 303, the transmission-side L2/L3 selecting module 324, the transmission-side L3 processing module 326, and the shaper module 327. In the shaper module 327, the ECN-echo ACK packet passes through the queue control module 401, the L2/L3 selecting module 403, and the L3-side ECN subject determining module 405, and is handed over to the queue 402, without being processed by the ECN marking executing module 346 and the total checksum computing module 357, to be output to the transmitting/receiving circuit 311 of the relevant NIF 301.

In the case where the relay apparatus 7, 8, 10 are L3 switches, the configuration of the relay apparatus 7, 8, and 10 is exactly as illustrated in FIG. 3. In the relay apparatus 10 which is set up at the border between the L2 network 6 and the L3 network 5, in particular, a packet transported from the L2 network 6 to another network, the L3 network 5, is processed by the reception-side L3 processing module 323 and the transmission-side L3 processing module 326, which relate to L3 relay. A packet transported from the L2 network 6 back to the same network, the L2 network 6, is transported by the reception-side L2 processing module 322 and the transmission-side L2 processing module 325, which relate to L2 relay. In the relay apparatus 7 and 8 which executes only L3 relay in the L3 networks 4 and 5, the reception-side L3 processing module 323 and the transmission-side L3 processing module 326 process a packet, and the reception-side L2 processing module 322 and the transmission-side L2 processing module 325 do not transport a packet.

In the case where the relay apparatus 7 and 8 are routers, the reception-side L2/L3 selecting module 321, the reception-side L2 processing module 322, the transmission-side L2/L3 selecting module 324, and the transmission-side L2 processing module 325 are eliminated from the components of FIG. 3. A packet read out of the buffer 312 is transported to the reception-side L3 processing module 323, and a packet read out of the relay processing unit 303 is transported to the transmission-side L3 processing module 326.

An ECN-echo ACK packet that is received by the relay apparatus 9 set up in the L2 network 6 passes through the NIF 301, the reception-side L2/L3 selecting module 321, the reception-side L2 processing module 322, the relay processing unit 303, the transmission-side L2/L3 selecting module 324, the transmission-side L2 processing module 325, and the shaper module 327. In the shaper module 327, the ECN-echo ACK packet passes through the queue control module 401, the L2/L3 selecting module 403, and the L2-side ECN subject determining module 404, and is handed over to the queue 402, without being processed by the ECN marking executing module 346 and the differential checksum computing module 347, to be output to the transmitting/receiving circuit 311 of the relevant NIF 301.

An ECN-echo ACK packet in which the ACK field of the code bit 240 has a value "1" is determined as a non-ECN determination subject in any case by the ECN subject determining module 344, the L2-side ECN subject determining module 404, and the L3-side ECN subject determining module 405. Accordingly, ECN marking, differential checksum computation, and total checksum computation are not executed for an ECN-echo ACK packet. The processing load on the relay apparatus 300 is thus lightened.

<Operation Processing Flow of the Relay Apparatus 300>

An operation processing flow of the relay apparatus 300 is described next.

First, the total checksum computing module 357 executes a rewrite of the L3 header 203 (Step S51). Specifically, the total checksum computing module 357 sets "0" to a value H of the checksum field 235 in the L3 header 203. The total checksum computing module 357 also rewrites the value of the TOS field 230 with a value indicating that the frame F has been marked by ECN congestion marking.

The total checksum computing module 357 next obtains a two bytes-by-two bytes basis additional value S for the L3 header 203 rewritten in Step S51 (Step S52). The total checksum computing module 357 then obtains a carried additional value S' for the last two least significant bytes of the additional value S (Step S53). Thereafter, the total checksum computing module 357 obtains a 1's complement C1 of the additional value S' (Step S54). The obtained complement C1 is the total checksum and is written in the checksum field 235 by the total checksum computing module 357 (Step S55). This completes processing executed by the total checksum computing module 357.

An example of computing the total checksum is described. The L3 header 203 for which the total checksum is computed has the following values, for example. The total checksum that is calculated in the example given here is one obtained when the TOS field 230 is rewritten and changes from TOS=0x01 (ECN supported) to TOS=0x03 (ECN congestion detected).

0x45 0x01 0x00 0x28

0xFE 0x2D 0x40 0x00

0x14 0x06 0xE9 0xA0

0xFF 0xFF 0xFF 0xFF

0x7F 0x00 0x00 0x01

(1) A value "0x01" in the first row is the value of the TOS field 230, and indicates that the value of the ECN field 231 which takes up the last two least significant bits of the TOS field 230 is "01". Because ECN marking is executed prior to the total checksum computation, the value of the ECN field 231 which is "01" is rewritten with a value "11", which indicates that ECN has been executed, and "0x01" in the first row is rewritten with "0x03". The L3 header 203 after this rewrite is as follows.

0x45 0x03 0x00 0x28
0xFE 0x2D 0x40 0x00
0x14 0x06 0xE9 0xA0
0xFF 0xFF 0xFF 0xFF
0x7F 0x00 0x00 0x01

(2) The total checksum computing module 357 next computes the total checksum for the L3 header 203 that has undergone the rewrite of the TOS field 230 of (1). The total checksum computing module 357 in this step puts "0" in place of "0xE9 0xA0" in the third row, which is the value H of the checksum field 235 in the L3 header 203 after the rewrite of the TOS field 230. The L3 header 203 after this rewrite is as follows.

0x45 0x03 0x00 0x28
0xFE 0x2D 0x40 0x00
0x14 0x06 0x00 0x00
0xFF 0xFF 0xFF 0xFF
0x7F 0x00 0x00 0x01

(3) The total checksum computing module 357 obtains the two bytes-by-two bytes basis additional value S for the L3 header 203 that has undergone the rewrite of (2).

$$S = 0x4503 + 0x0028 + 0xFE2D + 0x4000 + 0x1406 +$$
$$0x000 + 0xFFFF + 0xFFFF + 0x7F00 + 0x0001 = 0x4165D$$

(4) The total checksum computing module 357 next computes the carried additional value S' for the last two least significant bytes of the additional value S of (3).

$$S'=0x165D+4=0x1661$$

(5) Lastly, the total checksum computing module 357 obtains the 1's complement of the additional value S', thereby computing the total checksum C1 of the L3 header 203 after the rewrite.

$$C1=0xFFFF-S'=0xE99E$$

The total checksum computing module 357 writes the total checksum C1 computed in (5) in the checksum field 235, and then outputs the frame F.

Described next is an example of differential checksum computation processing steps which are executed by the differential checksum computing module 347. The differential checksum computing module 347 first calculates a 1's complement H' of the value H of the checksum field 235 in the L3 header 203 (Step S61).

The differential checksum computing module 347 next adds the 1's complement H' obtained in Step S61 to a two bytes-by-two bytes basis differential M1-M0, thereby obtaining an additional value H" (Step S62). The symbol M0 represents the value of the TOS field 230 prior to a rewrite and M1 represents the value of the TOS field 230 after the rewrite.

The differential checksum computing module 347 then obtains a carried additional value H'" for the last two least significant bytes of the additional value H" obtained in Step S62 (Step S63). Thereafter, the differential checksum computing module 347 obtains a 1's complement C2 of the additional value H'" obtained in Step S63 (Step S64). The obtained complement C2 is the differential checksum and is written in the checksum field 235 by the differential checksum computing module 347 (Step S65). This completes processing executed by the differential checksum computing module 347.

An example of computing a differential checksum is described. The L3 header 203 for which a differential checksum is computed has, for example, the following values as in the example described above. The differential checksum calculated in the example given here is also one obtained when the TOS field 230 is rewritten and changes from TOS=0x01 (ECN supported) to TOS=0x03 (ECN congestion detected).

0x45 0x01 0x00 0x28
0xFE 0x2D 0x40 0x00
0x14 0x06 0xE9 0xA0
0xFF 0xFF 0xFF 0xFF
0x7F 0x00 0x00 0x01

(11) The differential checksum computing module 347 first computes the 1's complement H' of the value H of the checksum field 235 in the L3 header 203.

$$H'=0xFFFF-H=0xFFFF-0xE9A0=0x165F$$

(12) The differential checksum computing module 347 next adds the 1's complement H' obtained in (11) to the differential (M1-M0) between M0, which is the value of the TOS field 230 in the L3 header 203 prior to the rewrite, and M1, which is the value of the TOS field 230 after the rewrite, thereby obtaining the additional value H".

$$H'' = H' + (M1 - M0)$$
$$= 0x165F + (0x03 - 0x01)$$
$$= 0x165F + 0x0002$$
$$= 0x1661$$

(13) The differential checksum computing module 347 then computes the carried additional value H'" for the last two least significant bytes of the additional value H" obtained in (12).

$$H'''=0x1661+0x0000=0x1661$$

(14) Lastly, the differential checksum computing module 347 obtains the 1's complement of the additional value H'" obtained in (13), thereby computing the differential checksum C2, which is a differential checksum after the rewrite of the L3 header 203.

$$C2=0xFFFF-H'''=0xFFFF-0x1661=0xE99E$$

The differential checksum computing module 347 writes the differential checksum C2 computed in (14) in the checksum field 235, and then outputs the frame F.

Differential checksum computation differs from total checksum computation in the specifics of computing processing, but the same result as in total checksum computation can be obtained in differential checksum computation.

Figure 5:
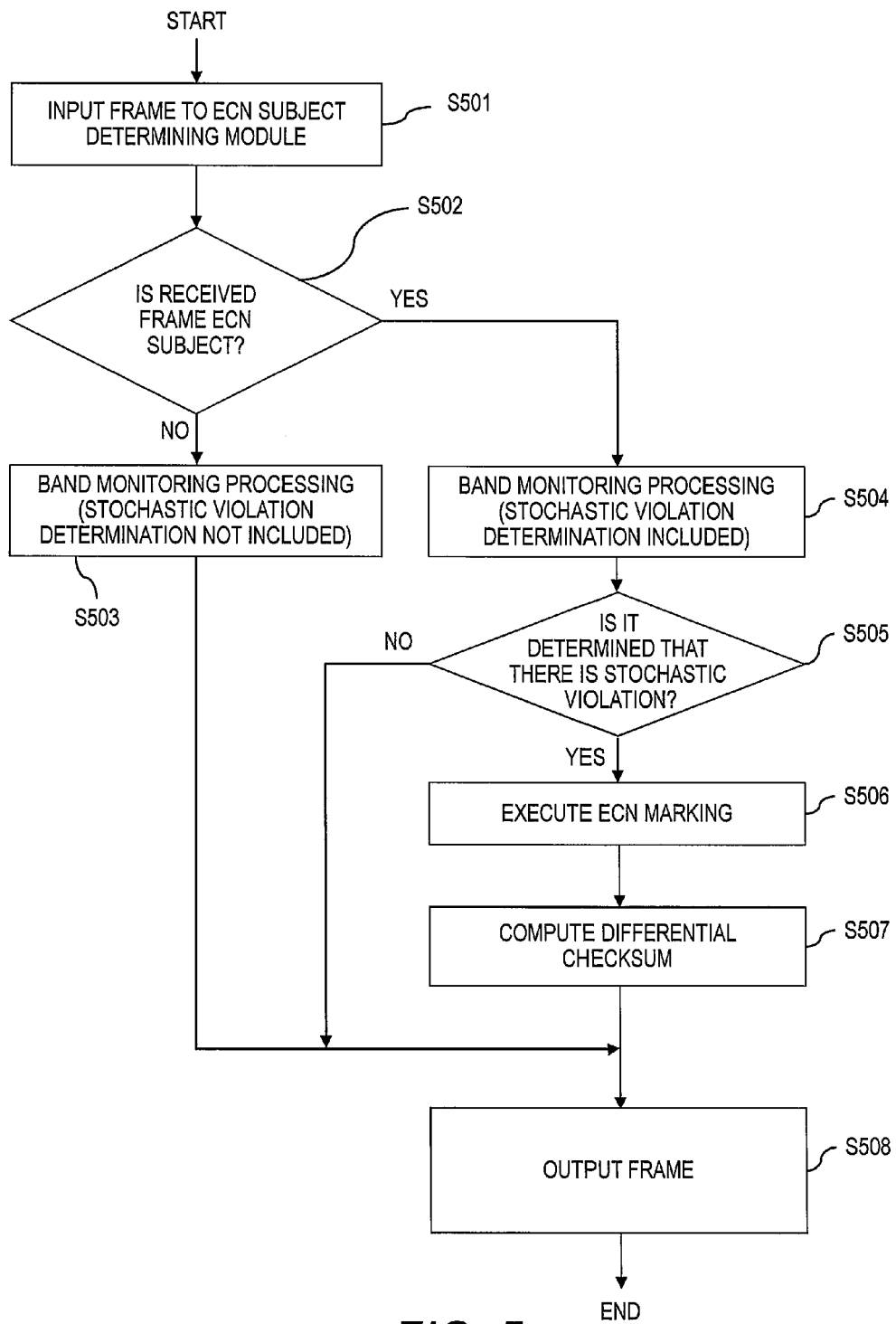
FIG. 5 is a flow chart illustrating an example of processing steps that are executed by the reception-side L2 processing module or the transmission-side L2 processing module when the L3 header error checking module is not included.

FIG. 5 is a flow chart illustrating an example of processing steps that are executed by the reception-side L2 processing module 322 or the transmission-side L2 processing module 325 when the L3 header error checking module 341 is not included. FIG. 5 illustrates the flow of processing from the ECN subject determining module 344 to the differential checksum computing module 347.

First, the ECN subject determining module 344 receives an input of the frame F (Step S501) and determines whether or not the received frame F is an ECN subject (Step S502). In the case where the received frame F is not an ECN subject (Step S502: NO), the band monitoring module 345 executes the band monitoring processing for the received frame F (Step S503). The stochastic violation determination is not executed in this case. The processing then proceeds to Step S508.

In the case where the received frame F is an ECN subject (Step S502: YES), on the other hand, the band monitoring module 345 executes the band monitoring processing (Step S504). The band monitoring module 345 in this case executes the stochastic violation determination. The band monitoring module 345 determines whether or not there is a stochastic violation (Step S505). When it is not determined that there is a stochastic violation (Step S505: NO), the processing proceeds to Step S508.

When it is determined that there is a stochastic violation (Step S505: YES), on the other hand, the ECN marking executing module 346 executes ECN marking (Step S506), and the differential checksum computing module 347 computes a differential checksum (Step S507). Thereafter, the differential checksum computing module 347 outputs the updated frame F (Step S508). The updated frame F is output to the relay processing unit 303 in the case of the reception-side L2 processing module 322, and to the shaper module 327 in the case of the transmission-side L2 processing module 325.

The queue control module 401, the L2-side ECN subject determining module 404 or the L3-side ECN subject determining module 406, the ECN marking executing module 346, and the differential checksum computing module 347 in the shaper module 327 execute the same processing as the one illustrated in FIG. 5. In this case, Steps S503 to S505 are executed by the queue control module 401. In Step S508, the queue control module 401 outputs the updated frame F to the queue 402.

Figure 6:
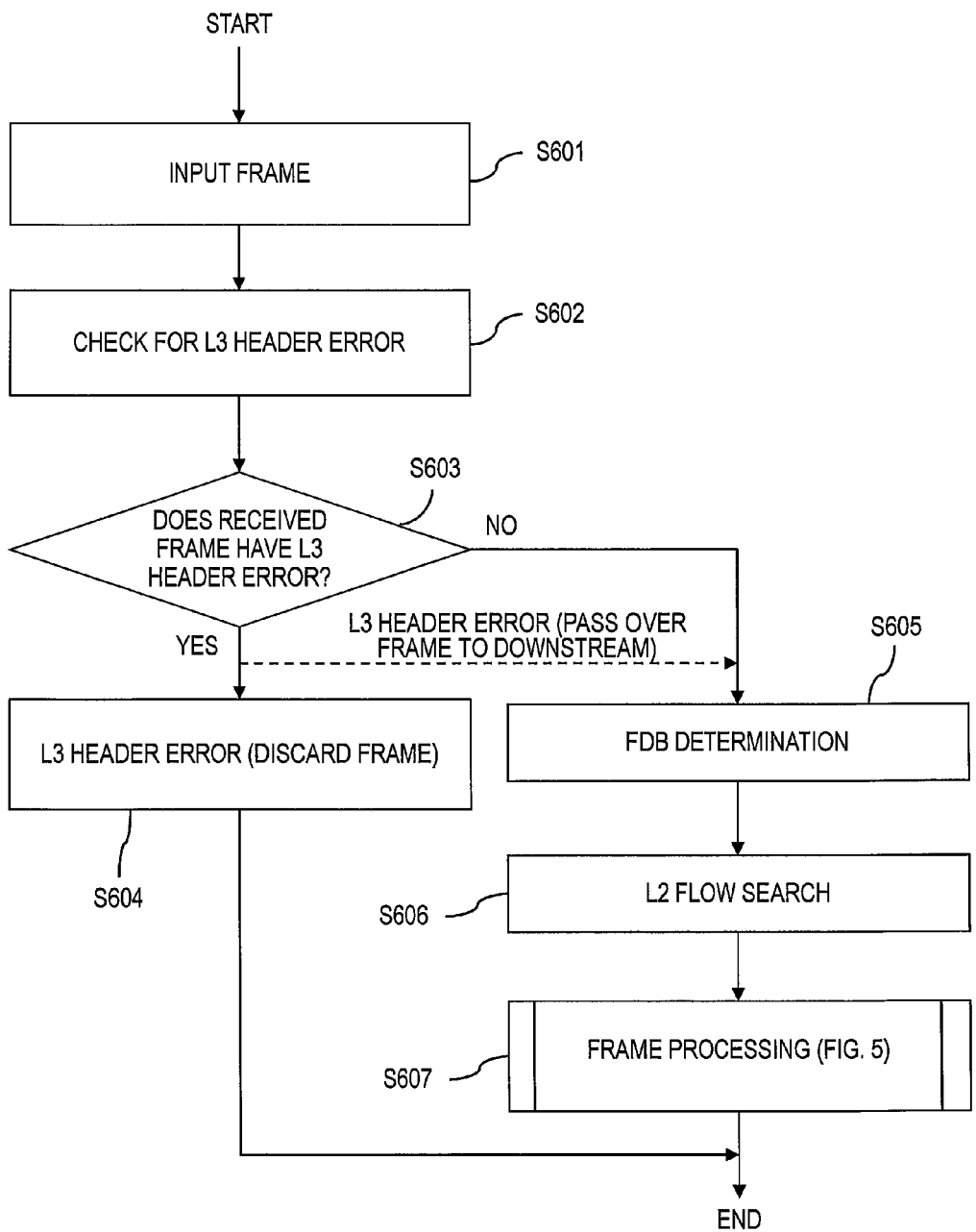
FIG. 6 is a flow chart illustrating an example of processing steps that are executed by the reception-side L2 processing module or the transmission-side L2 processing module when the L3 header error checking module is included.

FIG. 6 is a flow chart illustrating an example of processing steps that are executed by the reception-side L2 processing module 322 or the transmission-side L2 processing module 325 when the L3 header error checking module 341 is included. First, the L3 header error checking module 341 receives an input of the frame F (Step S601), and executes an L3 header error check (Step S602). In the case where the received frame F has an L3 header error (Step S603: YES), the L3 header error checking module 341 discards the received frame F (Step S604) and ends the processing.

In the case where the received frame F does not have an L3 header error (Step S603: NO), on the other hand, FDB determination of the FDB 342 is executed (Step S605). The L2 flow searching module 343 then searches for a flow to which the frame F belongs (Step S606), executes frame processing (Step S607), and ends the processing of FIG. 6. The frame processing (Step S607) is the series of processing steps illustrated in FIG. 5.

In Step S604, where the frame F is discarded, the frame F may not be discarded and may instead be passed over to the downstream while Step S605 and subsequent steps are executed. By passing over an error frame to the downstream in this manner, communication control of Layer 2 such as FDB learning of the FDB 342 can be maintained. In addition, information can be collected without missing any piece at a relay point where statistics and analysis of L3 information are conducted in an intensive manner, even when the frame F that has an error is output to the outside. A mode in which the frame F is discarded and a mode in which the frame F is passed over to the downstream may be prepared in the relay apparatus 300 so that a user can selectively set one of the modes.

According to this embodiment, congestion notification regulated for Layer 3 can thus be applied to Layer 2, and congestion that occurs in the L2 network 6 can be notified as well. In addition, an error included in the L3 header 203 can be preserved by using a differential checksum. The frame F that has an error in the L3 header 203 can therefore be relayed without being corrected erroneously. Another advantage of employing differential checksum computation is that the computation load is lightened than when total checksum computation is employed. Further, an erroneous correction of an error frame can be prevented by executing an L3 error check in L2 relay prior to congestion notification and discarding the frame F that has an error.

Though the detailed description has been given of this invention referring to the attached drawings, this invention is not limited to this specific configuration, and includes various modifications and equivalent configurations within the gist of the appended claims.

This invention also allows for a modification in which some components of one embodiment are replaced with components of another embodiment, and a modification in which components of one embodiment are added to components of another embodiment. Each embodiment may be modified by adding other components to some components of the embodiment, removing other components from some components of the embodiment, or replacing some components of the embodiment with other components. For instance, in L2 relay of the relay apparatus 300, the field in the L3 header 203 of FIG. 2 that is rewritten is not limited to the ECN field 231. The value of another field in the L3 header 203 may be updated so that the pre-update value and post-update value of the field are used in the computing of a characteristic value, which is added to the frame.

Some of or all of the components, functions, processing modules, processing means, and the like described above may be implemented by hardware by, for example, designing a suitable integrated circuit. The components, functions, and the like described above may also be implemented by software by using a processor to interpret and execute programs that implement the respective functions. The programs that implement the respective functions, tables, files, and other types of information can be stored in a non-volatile semiconductor memory which is provided inside or outside the relay apparatus, or in an internal or external storage device such as a hard disk drive or a solid state drive (SSD), or in a computer-readable non-transitory data storage medium such as an IC card, an SD card, or a DVD.

What is claimed is:

1. A relay apparatus, comprising:
   a network interface including a plurality of ports coupled to a network;
   a processor connected to a memory which stores instructions that, when executed by the processor, cause the processor to execute:
   a Layer 2 processing module to relay, via the network, a frame that includes a Layer 2 header and a Layer 2 data segment, the Layer 2 data segment including a Layer 3 header and a Layer 3 data segment based on a MAC destination address included in the Layer 2 header,
   wherein the Layer 2 processing module includes a Layer 2 updating module to update a value of a particular field out of a plurality of fields of the Layer 3 header when frame is relayed by the Layer 2 processing module,
   a Layer 3 processing module to execute path selecting processing following a Layer 3 protocol, and a selection module to select one of the Layer 2 processing module and the Layer 3 processing module based on a destination MAC address stored in the frame, and output the frame to the selected one of the Layer 2 processing module and the Layer 3 processing module, wherein the Layer 2 updating module uses a first characteristic value related to the Layer 3 header, which is stored in a given field out of the plurality of fields, and a pre-update value and a post-update value of the particular field to compute a second characteristic value related to the Layer 3 header, and updates the value of the given field from the first characteristic value to the second characteristic value; and wherein the network interface outputs, to the network, the frame updated by the Layer 2 updating module from a specified port from among the plurality of ports as an output destination of the updated frame.

2. The relay apparatus according to claim 1, wherein, when congestion is detected, the Layer 2 updating module is configured to update a value of an ECN field, which is the particular field, with a value that indicates that congestion has been detected.

3. The relay apparatus according to claim 1, wherein the Layer 2 processing module further includes a determining module configured to determine whether or not the frame is incapable of ECN, and, when the frame is incapable of ECN, the frame is output from the output unit without executing the update by the Layer 2 updating module.

4. The relay apparatus according to claim 1, wherein the Layer 2 processing module further includes a detection module configured to detect an error in the Layer 3 header, and discard the frame when the error is detected.

5. The relay apparatus according to claim 1, wherein the Layer 2 processing module further includes a detection module configured to detect an error in the Layer 3 header, and relays the frame regardless of a result of the detection of the error.

6. A relay apparatus, comprising:

a network interface including a plurality of ports coupled to a network, and that receives a frame from one of the plurality of ports; and a processor connected to a memory which stores instructions that, when executed by the processor, cause the processor to execute:

a first determining module to determine whether or not a frame that comprises a Layer 2 header and a Layer 2 data segment is an ECN subject, the Layer 2 data segment comprising a Layer 3 header and a Layer 3 data segment;

a second determining module to determine, when congestion is detected with respect to a frame that is determined as an ECN subject by the first determining module, whether or not congestion notification is to be executed via the frame;

an ECN marking executing module to update, when the second determining module determines that congestion notification is to be executed, a value of an ECN field with a value that indicates that congestion has been detected;

a differential checksum computing module to use, when the second determining module determines that congestion notification is to be executed, a first characteristic value related to the Layer 3 header, which is stored in a given field of the frame, and a pre-update value and post-update value of the ECN field updated by the ECN marking executing module to compute a second characteristic value related to the Layer 3 header, and to update a value of the given field from the first characteristic value to the second characteristic value, wherein the network interface transmits the frame updated by the ECN marking executing module and the differential checksum computing module from one of the plurality of ports that is specified as an output destination of the updated frame based on a destination MAC address stored in the received frame.

7. The relay apparatus according to claim 6, wherein the processor is further configured to execute a band monitoring module, including the second determining module, to conduct band monitoring for the frame in a manner that varies depending on a result of the determination made by the first determining module, and wherein, when congestion is detected with respect to the frame that is determined as an ECN subject by the first determining module, the band monitoring module uses the second determining module to determine whether or not congestion notification is to be executed via the frame.

8. The relay apparatus according to claim 6, wherein the processor is further configured to execute:

a Layer 2 processing module to execute processing that is related to Layer 2 for the frame received from the transmitting/receiving unit;

a queue for storing the frame processed by the Layer 2 processing module; and a queue control module, including the second determining module, to control the queue, wherein the first determining module determines whether or not the frame stored in the queue is an ECN subject, and wherein, when congestion is detected with respect to the frame that is determined as an ECN subject by the first determining module, the queue control module uses the second determining module to determine whether or not congestion notification is to be executed via the frame.

9. A relay method for a relay apparatus which includes a network interface which has a plurality of ports coupled to a network, and a processor connected to a memory which stores instructions that, when executed by the processor, cause the processor to perform the relay method comprising:

executing a Layer 2 processing module for relaying, via the network, a frame that comprises a Layer 2 header and a Layer 2 data segment, the Layer 2 data segment comprising a Layer 3 header and a Layer 3 data segment;

updating, by the Layer 2 processing module, a value of a particular field out of a plurality of fields of the Layer 3 header, using a first characteristic value related to the Layer 3 header, which is stored in a given field out of the plurality of fields, and a pre-update value and post-update value of the particular field to compute a second characteristic value related to the Layer 3 header, and updating a value of the given field from the first characteristic value to the second characteristic value;

using, by the Layer 2 updating module, a first characteristic value related to the Layer 3 header, which is stored in a given field out of the plurality of fields, and a pre-update value and a post-update value of the particular field to compute a second characteristic value related to the Layer 3 header, and updating the value of the given field from the first characteristic value to the second characteristic value;

executing a Layer 3 processing module to execute path selecting processing following a Layer 3 protocol;

executing a selection module to select one of the Layer 2 processing module and the Layer 3 processing module based on a destination MAC address stored in the frame, and output the frame to the selected one of the Layer 2 processing module and the Layer 3 processing module; and outputting, by the network interface, to the network, the frame in which the value of the particular field is updated and the given field is updated from a specified port from among the plurality of ports as an output destination of the updated frame.

* * * * *